(12) United States Patent
Chien et al.

(10) Patent No.: US 11,050,298 B2
(45) Date of Patent: Jun. 29, 2021

(54) WIRELESS DEVICE

(71) Applicant: TDK TAIWAN CORP., Taoyuan (TW)

(72) Inventors: Feng-Lung Chien, Taoyuan (TW);
Hsiang-Hui Hsu, Taoyuan (TW);
Chien-Hung Lin, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 15 days.

(21) Appl. No.: 16/131,365

(22) Filed: Sep. 14, 2018

(65) Prior Publication Data

US 2019/0089196 A1 Mar. 21, 2019

Related U.S. Application Data

(60) Provisional application No. 62/559,105, filed on Sep. 15, 2017.

(30) Foreign Application Priority Data

Aug. 31, 2018 (CN) .......................... 201821427391.5

(51) Int. Cl.
| | |
|---|---|
| *H02J 50/12* | (2016.01) |
| *H04B 5/00* | (2006.01) |
| *H01F 38/14* | (2006.01) |
| *H02J 50/10* | (2016.01) |
| *H01F 3/10* | (2006.01) |
| *H01F 27/28* | (2006.01) |
| *H02J 7/02* | (2016.01) |

(52) U.S. Cl.
CPC ................ *H02J 50/12* (2016.02); *H01F 3/10* (2013.01); *H01F 38/14* (2013.01); *H02J 50/10* (2016.02); *H04B 5/0037* (2013.01); *H04B 5/0087* (2013.01); *H01F 27/2871* (2013.01); *H01F 2003/106* (2013.01); *H01F 2038/143* (2013.01); *H02J 7/025* (2013.01)

(58) Field of Classification Search
USPC ......................................................... 320/108
See application file for complete search history.

(56) References Cited

U.S. PATENT DOCUMENTS

| | | | | |
|---|---|---|---|---|
| 2009/0033280 A1* | 2/2009 | Choi | ....................... | H02J 50/90 320/108 |
| 2014/0028252 A1* | 1/2014 | Vuori | ...................... | H02J 50/40 320/108 |
| 2014/0091758 A1* | 4/2014 | Hidaka | ................ | H04B 5/0093 320/108 |
| 2014/0210406 A1* | 7/2014 | Na | .......................... | H02J 5/005 320/108 |
| 2014/0306656 A1* | 10/2014 | Tabata | .................... | H01F 38/14 320/108 |
| 2016/0064991 A1* | 3/2016 | Chung | ................... | H02J 7/045 320/108 |

\* cited by examiner

*Primary Examiner* — Samuel Berhanu
(74) *Attorney, Agent, or Firm* — Muncy, Geissler, Olds & Lowe, P.C.

(57) ABSTRACT

A wireless device is provided and includes a substrate, a first coil and a second coil. The first coil is configured to be wound around a first axis, and the first coil is disposed on the substrate and is configured to operate in a wireless charging mode. The second coil is disposed on the substrate and configured to operate in a wireless communication mode. The wires of the second coil partially overlap the wires of the first coil.

10 Claims, 6 Drawing Sheets

WIRELESS DEVICE

CROSS REFERENCE TO RELATED APPLICATIONS

This application claims the benefit of U.S. Provisional Application No. 62/559,105, filed Sep. 15, 2017, and China Patent Application No. 201821427391.5, filed Aug. 31, 2018, the entirety of which are incorporated by reference herein.

BACKGROUND OF THE DISCLOSURE

Field of the Disclosure

The present disclosure relates to a wireless device, and more particularly to a wireless device capable of performing wireless charging and wireless communication functions at the same time.

Description of the Related Art

As technology has progressed, many kinds of electronic devices such as tablet computers and smartphones have begun to include the functionality of wireless charging. A user can place the electronic device on a wireless charging transmitting terminal, so that the wireless charging receiving terminal in the electronic device generates current to charge the battery by electromagnetic induction or electromagnetic resonance. Due to the convenience of wireless charging, electronic devices equipped with wireless charging modules have gradually become popular.

Currently, wireless charging devices and wireless communication devices have been gradually applied in the automotive field. For example, a car door can be equipped with a wireless communication chip, such as a Near Field Communication (NFC) chip. A user can use a mobile phone with the NFC function and open a corresponding application so as to open the door or start the car using NFC technology. Furthermore, a wireless charging device can be equipped inside the car. When the user enters the car, the mobile phone can be placed on the wireless charging device to charge the mobile phone. However, in the process of wireless charging, if the user wants to use the wireless communication function again, the mobile phone must be moved from the wireless charging device to a place adjacent to the wireless communication device, and therefore it will affect the safety of driving.

Therefore, how to design a wireless device capable of performing wireless charging and wireless communication functions at the same time is a topic nowadays that needs to be discussed and solved.

BRIEF SUMMARY OF THE DISCLOSURE

Accordingly, one objective of the present disclosure is to provide a wireless device to solve the above problems.

According to some embodiments of the disclosure, a wireless device is provided, and the wireless device includes a substrate, a first coil and a second coil. The first coil is configured to be wound around a first axis, and the first coil is disposed on the substrate to operate in a wireless charging mode. The second coil is disposed on the substrate and configured to operate in a wireless communication mode. The wires of the second coil partially overlap the wires of the first coil.

According to some embodiments, the first axis is substantially perpendicular to the substrate, and the substrate, the second coil and the first coil are arranged along the first axis. According to some embodiments, the second coil and the first coil are disposed on the same side of the substrate.

According to some embodiments, the first coil does not overlap the second coil when viewed along a second axis which is perpendicular to the first axis.

According to some embodiments, the wireless device includes two first coils, and the wires of the first coils partially overlap each other when viewed along the first axis.

According to some embodiments, the wireless device includes two first coils and a third coil, and the third coil overlaps the first coils when viewed along the first axis.

According to some embodiments, the substrate overlaps the second coil when viewed along a second axis which is perpendicular to the first axis. According to some embodiments, the substrate includes a first magnetic conductive plate and a second magnetic conductive plate, and the first magnetic conductive plate overlaps the second magnetic conductive plate when viewed along the second axis.

According to some embodiments, the substrate overlaps the first coil when viewed along a second axis which is perpendicular to the first axis. According to some embodiments, the substrate includes a first magnetic conductive plate and a second magnetic conductive plate, and the first magnetic conductive plate does not overlap the second magnetic conductive plate when viewed along the second axis.

According to some embodiments of the disclosure, a wireless device is provided, and the wireless device includes a substrate, a plurality of first coils and a control unit. The plurality of first coils is configured to be wound around a first axis, and the first coils are disposed on the substrate. The control unit is connected to the first coils, and the control unit is configured to control the first coils to operate in a wireless charging mode or in a wireless communication mode.

According to some embodiments, the control unit is configured to control the first coils to switch between a parallel mode and a series mode.

According to some embodiments, the control unit is configured to control the first coils to be connected to each other in parallel so as to operate in the wireless communication mode.

According to some embodiments, the control unit is configured to control the first coils to be connected to each other in series so as to operate in the wireless charging mode.

According to some embodiments, the wireless device further includes a matching coil connected to the control unit. When the first coils are operated in either the wireless charging mode or the wireless communication mode, the control unit is configured to control the matching coil to be electrically connected to the first coils.

According to some embodiments, when the first coils are operated in the other of the wireless charging mode or the wireless communication mode, the control unit is configured to control the matching coil to be electrically independent from the first coils.

According to some embodiments, the wireless device further includes a second coil configured to operate in the wireless communication mode. According to some embodiments, the control unit controls the first coils to operate in the wireless charging mode and controls the second coil to operate in the wireless communication mode.

According to some embodiments, the second coil is disposed between the first coils and the substrate. According to some embodiments, the first coil has an input terminal and an output terminal, the second coil has an input terminal and an output terminal, and the input terminal and the output terminal of the first coil are separated from the input terminal and the output terminal of the second coil.

The present disclosure provides a wireless device having one or more first coils and a second coil. The first coil can operate in the wireless charging mode, and the second coil can operate in the wireless communication mode, such as operating in the near field communication mode. Therefore, when the wireless device wirelessly charges an external portable electronic device, the wireless device can also perform wireless communication with the external portable electronic device at the same time. As a result, the user only needs to place the portable electronic device on the wireless device of the present disclosure to achieve the purpose of wireless charging and wireless communication at the same time.

Furthermore, in some embodiments, the wireless device can further include a control unit, and the control unit can control the first coils to operate in a first wireless communication mode and control the second coils to operate in a second wireless communication mode. That is, the first coils and the second coil can operate in different frequency bands. For example, the first coils can be operated for the radio frequency identification (RFID) technology, and the second coil can be operated for the near field communication (NFC) technology.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean+/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 1:
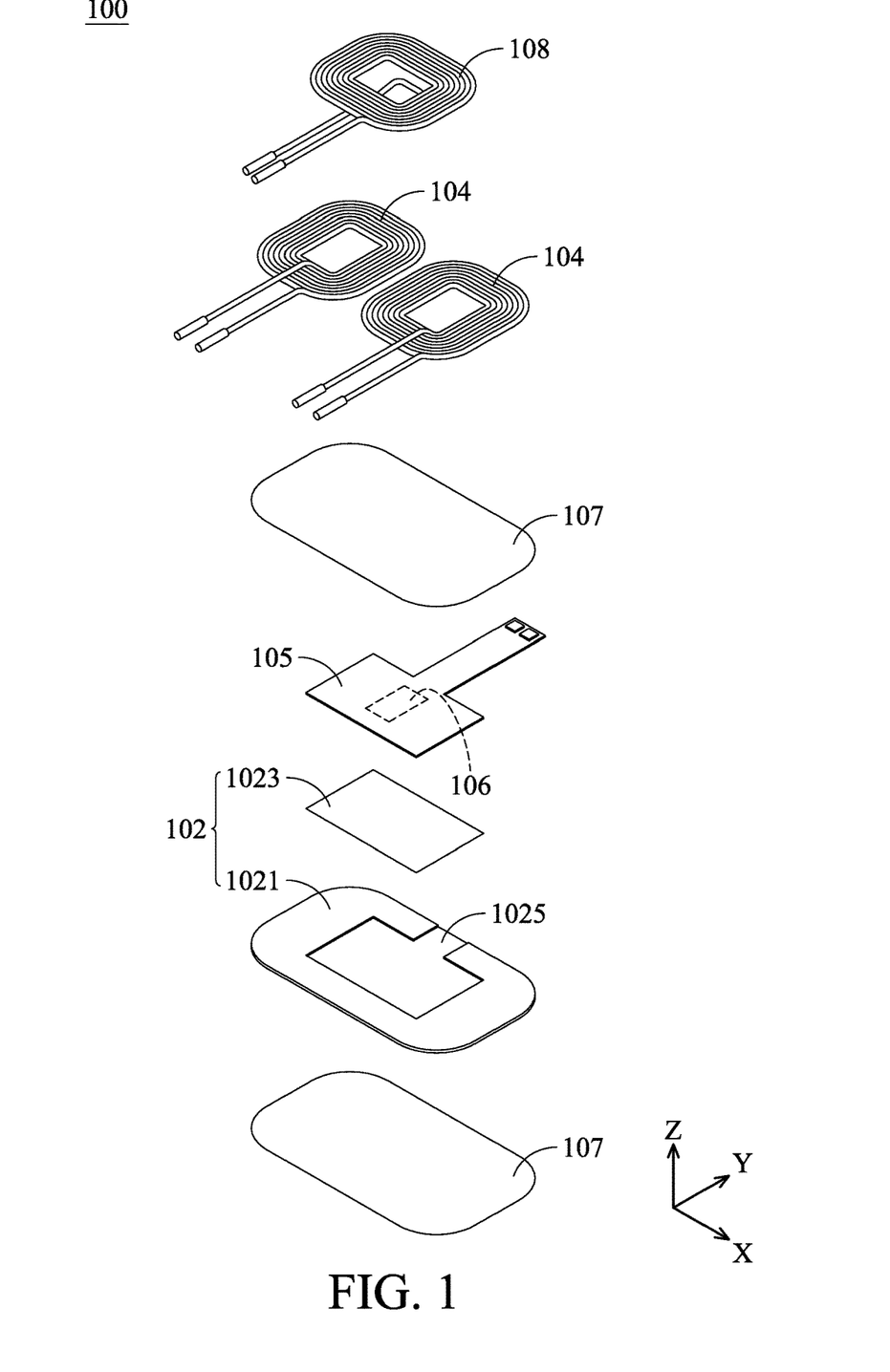
FIG. 1 shows an exploded diagram of a wireless device according to an embodiment of the present disclosure.

Please refer to FIG. 1, which is an exploded diagram of a wireless device 100 according to an embodiment of the present disclosure. As shown in FIG. 1, the wireless device 100 can include a substrate 102, two first coils 104, a circuit board 105, a second coil 106 and a third coil 108. In this embodiment, the first coils 104 and the third coil 108 are configured to be wound around a first axis (the Z-axis), the first coil 104 and the third coil 108 are disposed on the substrate 102 and are configured to operate in a wireless charging mode. In this embodiment, the first axis (the Z-axis) is substantially perpendicular to the substrate 102.

As shown in FIG. 1, the circuit board 105 and the second coil 106 are disposed on the substrate 102, and the second coil 106 is formed in the circuit board 105. That is, the second coil 106 is a plate coil, but it is not limited thereto. For example, the second coil 106 can also be implemented by winding a general enameled wire. In addition, the wireless device 100 can also include two insulating sheets 107. One of the insulating sheets 107 is disposed on the bottom of the substrate 102, and another one of the insulating sheets 107 is disposed between the circuit board 105 and the first coils 104, so as to prevent the first coils 104 from being electrically connected to the circuit board 105.

In this embodiment, the substrate 102 can include a first magnetic conductive plate 1021 and a second magnetic conductive plate 1023. In this embodiment, the first magnetic conductive plate 1021 and the second magnetic conductive plate 1023 are made of magnetic materials having different magnetic permeability coefficients. For example, the first magnetic conductive plate 1021 has a magnetic permeability coefficient corresponding to the first coils 104 and third coil 108, and the second magnetic conductive plate 1023 has a magnetic permeability coefficient corresponding to the second coil 106.

In addition, as shown in FIG. 1, a groove 1025 can be formed on the first magnetic conductive plate 1021 corresponding to the shape of the second magnetic conductive plate 1023, so that the second magnetic conductive plate 1023 can be disposed inside the groove 1025.

In addition, as shown in FIG. 1, the second coil 106 is disposed between the substrate 102 and the first coils 104. Specifically, the substrate 102, the second coil 106, the first coils 104 and the third coil 108 are arranged along the first axis (the Z-axis).

It should be noted that the order of arrangement of these coils is not limited to this embodiment. For example, in other embodiments, the positions of the first coils 104 and the third coil 108 can be interchanged with the position of the second coil 106. However, it should be noted that in various embodiments of the present disclosure, the first coils 104, the third coil 108 and the second coil 106 are all disposed on the same side of the substrate 102.

Figure 2:
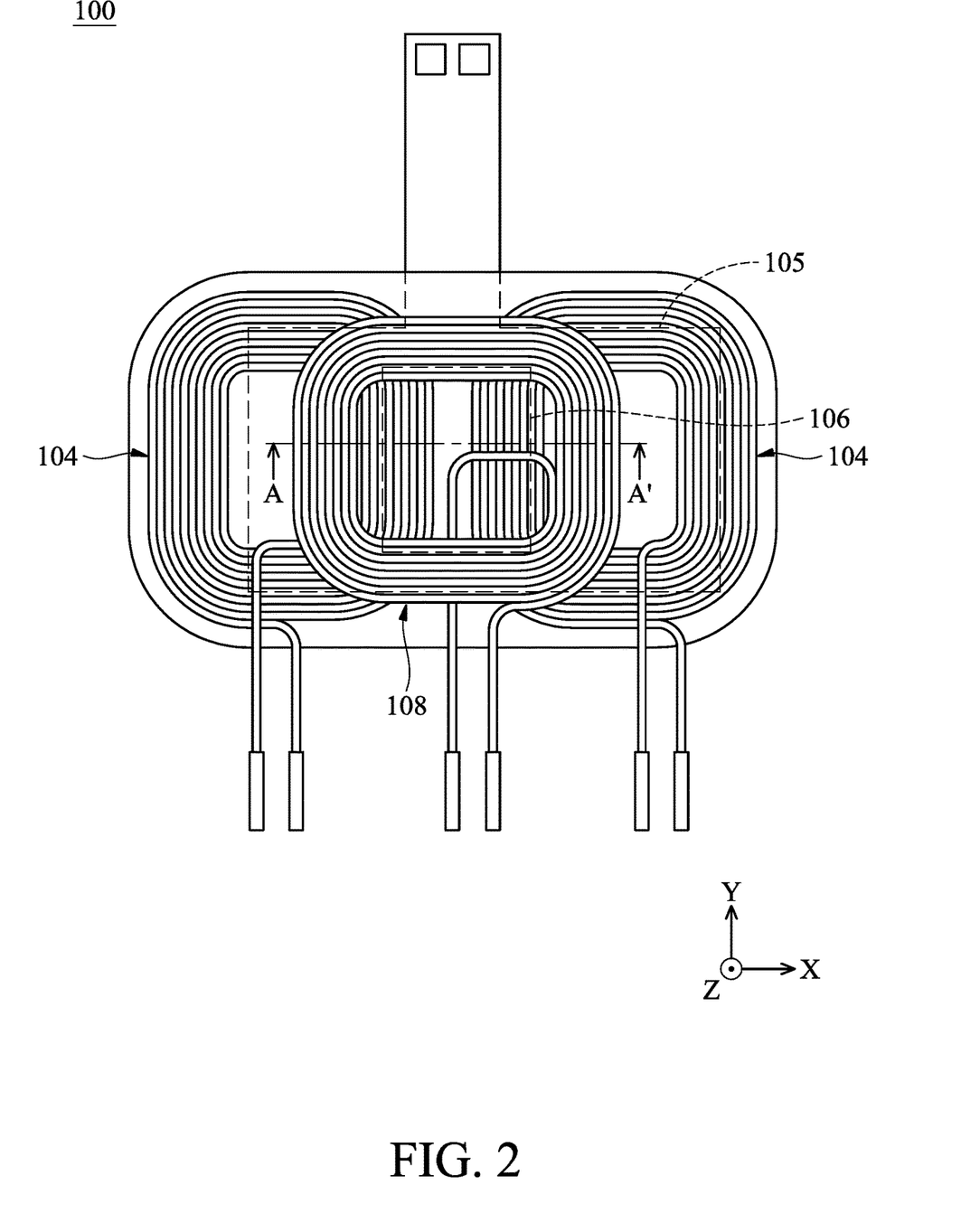
FIG. 2 shows a top view of the wireless device according to the embodiment of the present disclosure.

Please refer to FIG. 2, which shows a top view of the wireless device 100 according to the embodiment of the present disclosure. As shown in FIG. 2, when viewed along the first axis (the Z-axis), the wires of the second coil 106 partially overlap the wires of the first coils 104 and the third coil 108. In addition, the third coil 108 also overlaps the first coils 104. In this embodiment, the structure of the first coil 104 can be the same as the structure of the third coil 108, and it can be implemented using a general enameled wire. However, in other embodiments, the first coils 104 and the third coil 108 can also be implemented using a plate coil.

Furthermore, as shown in FIG. 2, the wires of the second coil 106 are located in the center position of the wireless device 100, but they are not limited to this embodiment. For example, the second coil 106 can also be disposed at a left position or a right position of the wireless device 100, and the size of the second coil 106 can also be determined according to actual design requirements.

Figure 3:
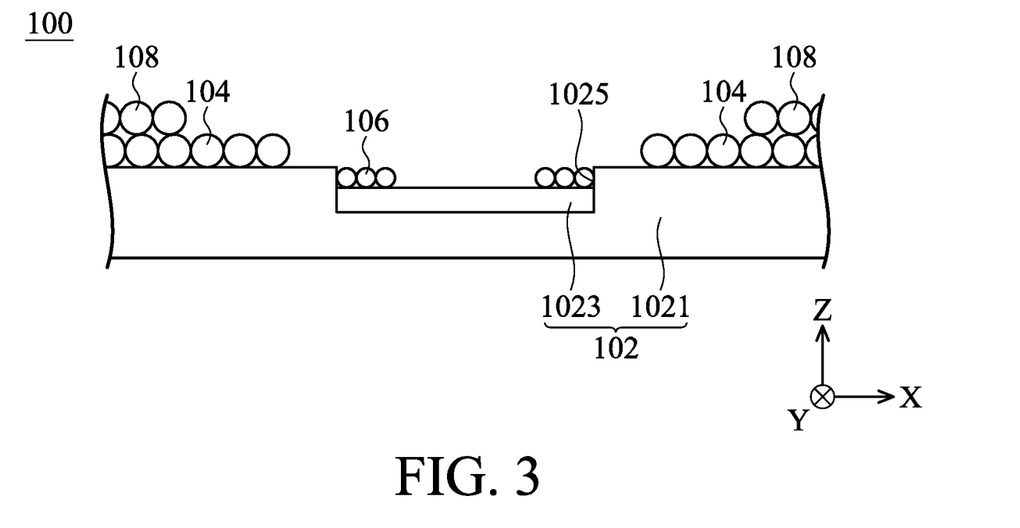
FIG. 3 shows a cross-sectional view of the wireless device along the line A-A' in FIG. 2 according to the embodiment of the present disclosure.

Please refer to FIG. 2 and FIG. 3, and FIG. 3 shows a cross-sectional view of the wireless device 100 along the line A-A' in FIG. 2 according to the embodiment of the present disclosure. As shown in FIG. 3, the second coil 106 and the second magnetic conductive plate 1023 are disposed in the groove 1025 of the first magnetic conductive plate 1021. Therefore, the substrate 102 overlaps the second coil 106 when viewed along a second axis (the X-axis) which is perpendicular to the first axis. In addition, the first magnetic conductive plate 1021 also overlaps the second magnetic conductive plate 1023. Furthermore, when viewed along the second axis (the X-axis) perpendicular to the first axis, the first coils 104 do not overlap the second coil 106, and the first coils 104 also do not overlap the third coil 108.

Based on the design of disposing the second magnetic conductive plate 1023 and the second coil 106 in the groove 1025, the thickness of the wireless device 100 along the first axis (the Z-axis) can be reduced, so as to achieve the purpose of miniaturizing the wireless device 100.

In this embodiment, the first coils 104 are configured to operate in a wireless charging mode (e.g., operating according to the standards of the Alliance for Wireless Power (A4WP), or operating based on the Qi standard of the Wireless Power Consortium (WPC)), and the second coil 106 is configured to operate in a wireless communication mode, such as operating in the Near Field Communication (NFC) mode.

In this embodiment, the second coil 106 can be controlled by a control chip, and the first coils 104 and the third coil 108 can be controlled by another control chip. Therefore, the wireless device 100 can perform the wireless charging function or the wireless communication function individually, or can perform the wireless charging function and the wireless communication function at the same time.

Figure 4:
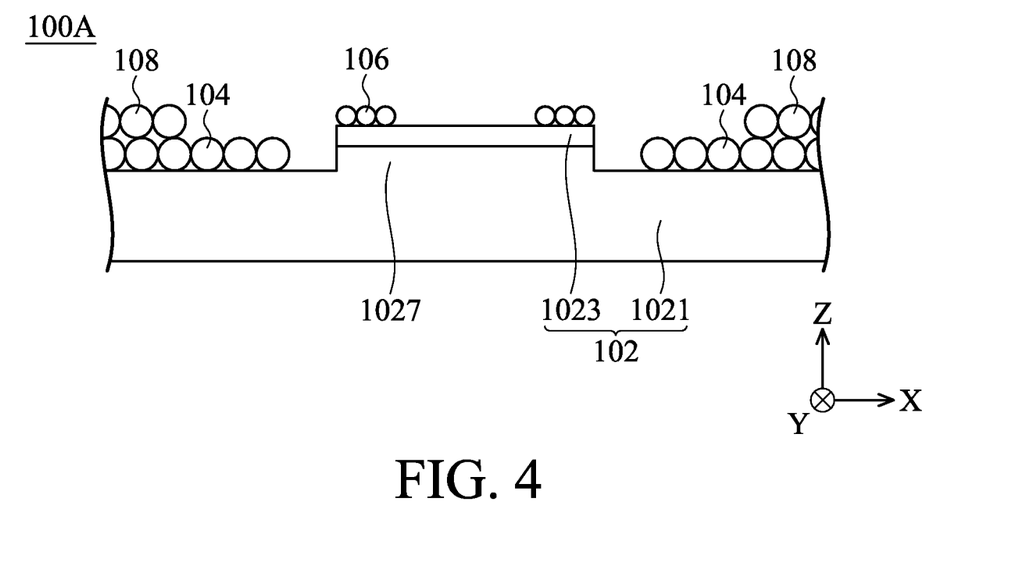
FIG. 4 shows a cross-sectional view of a wireless device according to another embodiment of the present disclosure.

Please refer to FIG. 4, which shows a cross-sectional view of a wireless device 100A according to another embodiment of the present disclosure. As shown in FIG. 4, a protruding portion 1027 can be formed on the first magnetic conductive plate 1021, and the second coil 106 and the second magnetic conductive plate 1023 are disposed on the protruding portion 1027. Therefore, when viewed along the second axis (the X-axis) perpendicular to the first axis, the substrate 102 overlaps the first coils 104, and the first magnetic conductive plate 1021 does not overlap the second magnetic conductive plate 1023.

Based on the structural configuration of this embodiment, the overall strength of the wireless device 100A can be increased, so as to improve the wireless charging efficiency and the wireless communication efficiency of the wireless device 100A.

It should be noted that the first magnetic conductive plate 1021 and the second magnetic conductive plate 1023 in the previous embodiments can also be integrally formed in one piece. Because they are integrally formed in one piece, it is not necessary to provide an adhesive material to achieve the purpose of miniaturization. Furthermore, the integrally formed first magnetic conductive plate 1021 and second magnetic conductive plate 1023 can be made of a material that can correspond to low-frequency and high-frequency electromagnetic waves at the same time.

Figure 5:
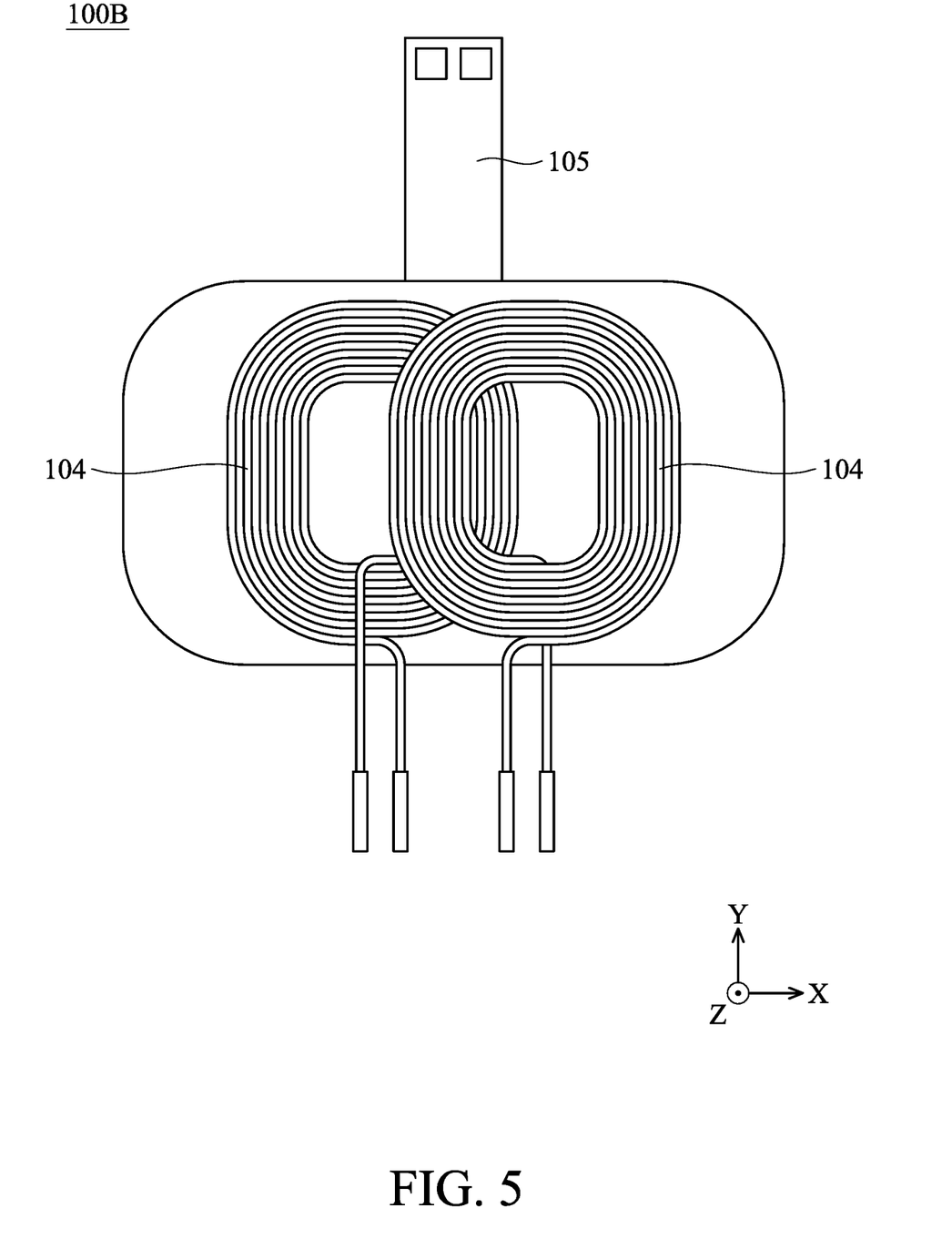
FIG. 5 shows a top view of a wireless device according to another embodiment of the present disclosure.

Please refer to FIG. 5, which shows a top view of a wireless device 100B according to another embodiment of the present disclosure. As shown in FIG. 5, the wireless device 100B is similar to the wireless device 100, and their difference is that, in this embodiment, the wireless device 100B only includes two first coils 104 and does not include the third coil 108. In addition, when viewed along the first axis (the Z-axis), the portions of the wires of the two first coils 104 partially overlap each other.

It can be well known according to the above embodiments that the number of first coils 104 can be determined according to actual requirements. When a larger charging area is required, a plurality of first coils 104 can be disposed in the wireless device. For example, four or five first coils 104 can be disposed in the wireless device, and its structural configuration can be similar to that of wireless device 100.

Figure 6:
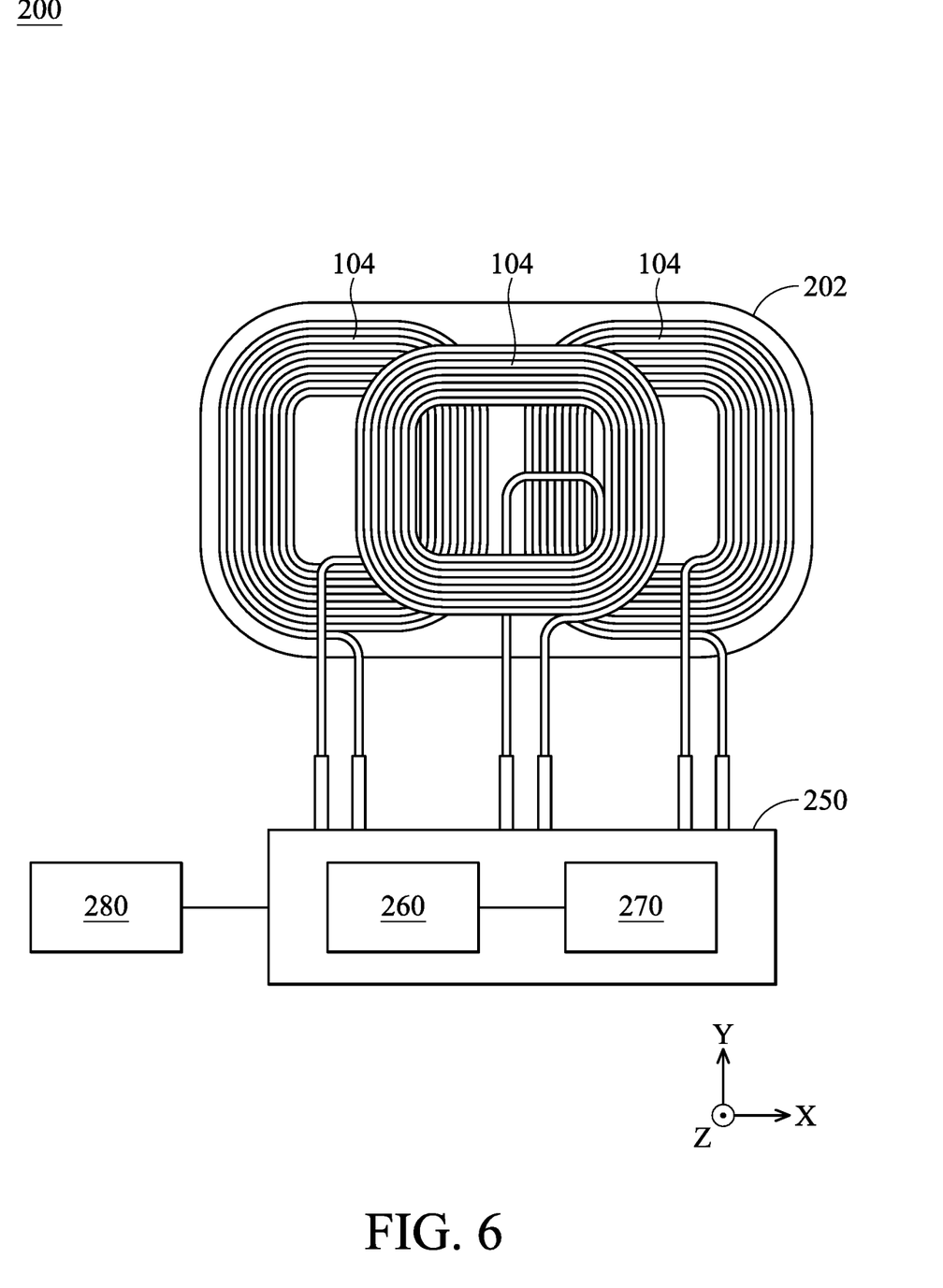
FIG. 6 shows a schematic diagram of a wireless device according to another embodiment of the present disclosure.

Please refer to FIG. 6, which shows a schematic diagram of a wireless device 200 according to another embodiment of the present disclosure. In this embodiment, the wireless device 200 includes a substrate 202, a plurality of first coils 104 and a control unit 250. Each of the first coils 104 is configured to be wound around the first axis, and the first coils 104 are disposed on the substrate 202. The substrate 202 is similar to the substrate 102 and is made of a magnetic material.

It should be noted that the configuration of the first coils 104 in the present embodiment can be the same as that of the wireless device 100 in the previous embodiments, or the number of first coils 104 can be increased in order to increase the area of wireless charging.

In this embodiment, the control unit 250 is connected to the first coils 104, and the control unit 250 is configured to control the first coils 104 to operate in a wireless charging mode or a wireless communication mode. Specifically, in this embodiment, the control unit 250 can include a control circuit 260 and a switching circuit 270. The switching circuit 270 can include a plurality of switches (such as MOS switches) configured to be electrically connected to the first coils 104, so as to control the manner of connection of the first coils 104. Additionally, the control circuit 260 is configured to control the switching of the aforementioned switches in the switching circuit 270, so as to control the first coils 104 to switch between a parallel mode and a series mode.

When the wireless device 200 is required to operate in the wireless communication mode, the switching circuit 270 can be switched according to the control signal of the control circuit 260, so that the first coils 104 are electrically connected to each other in parallel. Therefore, the overall resistance value of the first coils 104 can be reduced, and the overall inductance value can also be adjusted, so that the first coils 104 can operate in the wireless communication mode (such as a NFC communication mode).

On the other hand, when the wireless device 200 is required to operate in the wireless charging mode, the switching circuit 270 can be switched according to the control signal of the control circuit 260, so that the first coils 104 are electrically connected to each other in series. As a result, the first coils 104 can operate in the wireless charging mode. Because the first coils 104 are electrically connected to each other in series, the total number of turns of the coils of the wireless device 200 is increased, so as to improve the performance of the wireless device 200 when performing the wireless charging function.

In addition, in this embodiment, the wireless device 200 can further include a matching coil 280 which is connected to the control unit 250. When the first coils 104 operate in the wireless communication mode, the control unit 250 is configured to control the matching coil 280 to be electrically connected to the first coils 104. It should be noted that if the first coils 104 operate in the wireless charging mode, the control unit 250 is configured to control the matching coil 280 to be electrically independent from the first coils 104. That is, the control unit 250 controls the matching coil 280 not to be electrically connected to the first coils 104.

Moreover, in other embodiments, the control unit 250 can also control the matching coil 280 to be electrically connected to the first coils 104 when the first coils 104 operate in the wireless charging mode, and control the matching coil 280 not to be electrically connected to the first coils 104 when the first coils 104 operate in the wireless communication mode. By the arrangement of the matching coil 280, the inductance value of the first coils 104 can be adjusted, so that the first coil 104 can operate in a desired frequency band.

Figure 7:
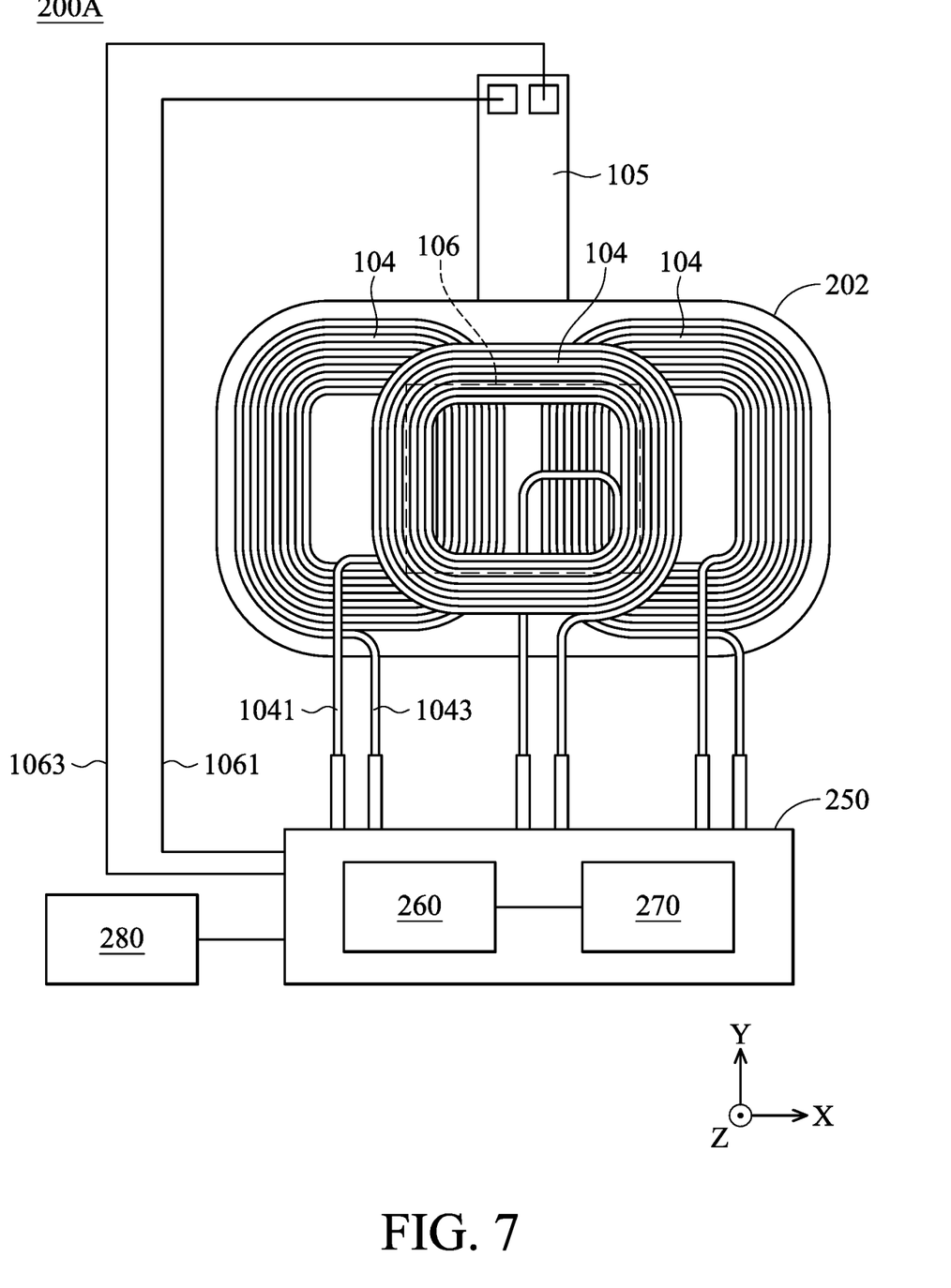
FIG. 7 shows a schematic diagram of a wireless device according to another embodiment of the present disclosure.

Please refer to FIG. 7, which shows a schematic diagram of a wireless device 200A according to another embodiment of the present disclosure. The wireless device 200A in this embodiment is similar to the wireless device 200. The difference between them is that the wireless device 200A in the embodiment further includes the circuit board 105 and the second coil 106. Similar to the wireless device 100, the second coil 106 is disposed between the first coils 104 and the substrate 202, and the second coil 106 is configured to operate in the wireless communication mode.

In this embodiment, the second coil 106 is electrically connected to the control unit 250, and it should be noted that each of the first coils 104 has an input terminal 1041 and an output terminal 1043. The second coil 106 has an input terminal 1061 and an output terminal 1063, and the input terminal 1041 and the output terminal 1043 of the first coil 104 are separated from the input terminal 1061 and the output terminal 1063 of the second coil 106. That is, the input terminal 1041 and the output terminal 1043 are not connected to the input terminal 1061 and the output terminal 1063.

In this embodiment, when the wireless device 200A is required to perform the wireless communication function and the wireless charging function at the same time, the control unit 250 can control the first coils 104 to operate in the wireless charging mode and control the second coil 106 to operate in the wireless communication mode.

In addition, it should be noted that, in some embodiments, the control unit 250 can control the first coils 104 to operate in a first wireless communication mode, and control the second coils 106 to operate in a second wireless communication mode. That is, the first coils 104 and the second coil 106 can operate in different frequency bands. For example, the first coils 104 can be operated for the radio frequency identification (RFID) technology, and the second coil 106 can be operated for the near field communication (NFC) technology. Applicable wireless communication technologies for the first coils 104 and the second coil 106 are not limited to this embodiment. Moreover, in this embodiment, by the arrangement of the matching coil 280, the inductance value of the first coils 104 or the second coil 106 can be adjusted, so that the first coil 104 or the second coil 106 can operate in a desired frequency band.

In conclusion, the present disclosure provides a wireless device having one or more first coils 104 and a second coil 106. The first coil 104 can operate in the wireless charging mode, and the second coil 106 can operate in the wireless communication mode, such as operating in the near field communication mode. Therefore, when the wireless device wirelessly charges an external portable electronic device, the wireless device can also perform wireless communication with the external portable electronic device at the same time. As a result, the user only needs to place the portable electronic device on the wireless device of the present disclosure to achieve the purpose of wireless charging and wireless communication at the same time.

Furthermore, in some embodiments, the wireless device can further include a control unit 250, and the control unit 250 can control the first coils 104 to operate in a first wireless communication mode and control the second coils 106 to operate in a second wireless communication mode. That is, the first coils 104 and the second coil 106 can operate in different frequency bands. For example, the first coils 104 can be operated for the radio frequency identification (RFID) technology, and the second coil 106 can be operated for the near field communication (NFC) technology.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A wireless device, comprising:
 a substrate, including a first magnetic conductive plate;
 a first coil, configured to be wound around a first axis, wherein the first coil is disposed on the substrate and is configured to operate in a wireless charging mode, wherein the first magnetic conductive plate is in direct contact with the first coil; and
 a second coil, disposed on the substrate and configured to operate in a wireless communication mode;
 wherein the wires of the second coil partially overlap the wires of the first coil;
 wherein a diameter of the first coil is different from a diameter of the second coil;
 wherein when viewed along a second axis perpendicular to the first axis, the first magnetic conductive plate at least partially overlaps the first coil or the second coil.

2. The wireless device as claimed in claim 1, wherein the first axis is substantially perpendicular to the substrate, and the substrate, the second coil and the first coil are arranged along the first axis, wherein the diameter of the first coil is greater than the diameter of the second coil.

3. The wireless device as claimed in claim 2, wherein the second coil and the first coil are disposed on the same side of the substrate.

4. The wireless device as claimed in claim 1, wherein the first coil does not overlap the second coil when viewed along the second axis which is perpendicular to the first axis.

5. The wireless device as claimed in claim 1, wherein the wireless device comprises another first coil, and the wires of the first coils partially overlap each other when viewed along the first axis.

6. The wireless device as claimed in claim 1, wherein the wireless device comprises another first coil and a third coil, and the third coil overlaps the first coils when viewed along the first axis.

7. The wireless device as claimed in claim 1, wherein the substrate overlaps the second coil when viewed along the second axis which is perpendicular to the first axis.

8. The wireless device as claimed in claim 7, wherein the substrate comprises a second magnetic conductive plate, and the first magnetic conductive plate overlaps the second magnetic conductive plate when viewed along the second axis.

9. The wireless device as claimed in claim 1, wherein the substrate overlaps the first coil when viewed along the second axis which is perpendicular to the first axis.

10. The wireless device as claimed in claim 9, wherein the substrate comprises a second magnetic conductive plate, and the first magnetic conductive plate does not overlap the second magnetic conductive plate when viewed along the second axis.

* * * * *